United States Patent [19]

Ota

[11] 4,190,869
[45] Feb. 26, 1980

[54] SLOW MOTION TAPE DRIVING SYSTEM IN A RECORDING AND/OR REPRODUCING APPARATUS

[75] Inventor: Yoshihiko Ota, Yokohama, Japan

[73] Assignee: Victor Company of Japan, Ltd., Yokohama, Japan

[21] Appl. No.: 908,917

[22] Filed: May 24, 1978

[30] Foreign Application Priority Data

May 31, 1977 [JP] Japan .................................. 52-63661
Jun. 7, 1977 [JP] Japan .................................. 52-66925

[51] Int. Cl.² ..................... H04N 5/795; G11B 19/26; G11B 15/46
[52] U.S. Cl. ........................................ 360/10; 360/73
[58] Field of Search ............................... 360/10, 14, 73

[56] References Cited

U.S. PATENT DOCUMENTS

| 3,869,709 | 3/1975 | Yamagishi et al. | 360/10 |
| 3,943,562 | 3/1976 | Opelt | 360/10 |
| 3,968,518 | 7/1976 | Kihara et al. | 360/10 |

Primary Examiner—Stuart N. Hecker

[57] ABSTRACT

A tape driving system is adapted to be used in a recording and/or reproducing apparatus having at least one rotating head for tracing tracks on which a video signal has been recorded. The tracks lie obliquely with respect to the tape longitudinal direction. The tape driving system comprises a capstan for driving the tape, a DC motor for driving the capstan, a circuit for forming a pulse-like voltage of a predetermined level over a predetermined interval of time at a given frequency, and a circuit for selectively applying either the pulse-like voltage from the forming circuit or a continuous driving voltage to the DC motor depending on the reproducing mode. The pulse-like voltage is applied to the motor when in a slow motion reproducing mode to intermittently rotate the motor and cause the capstan to intermittently shift the tape.

10 Claims, 5 Drawing Figures

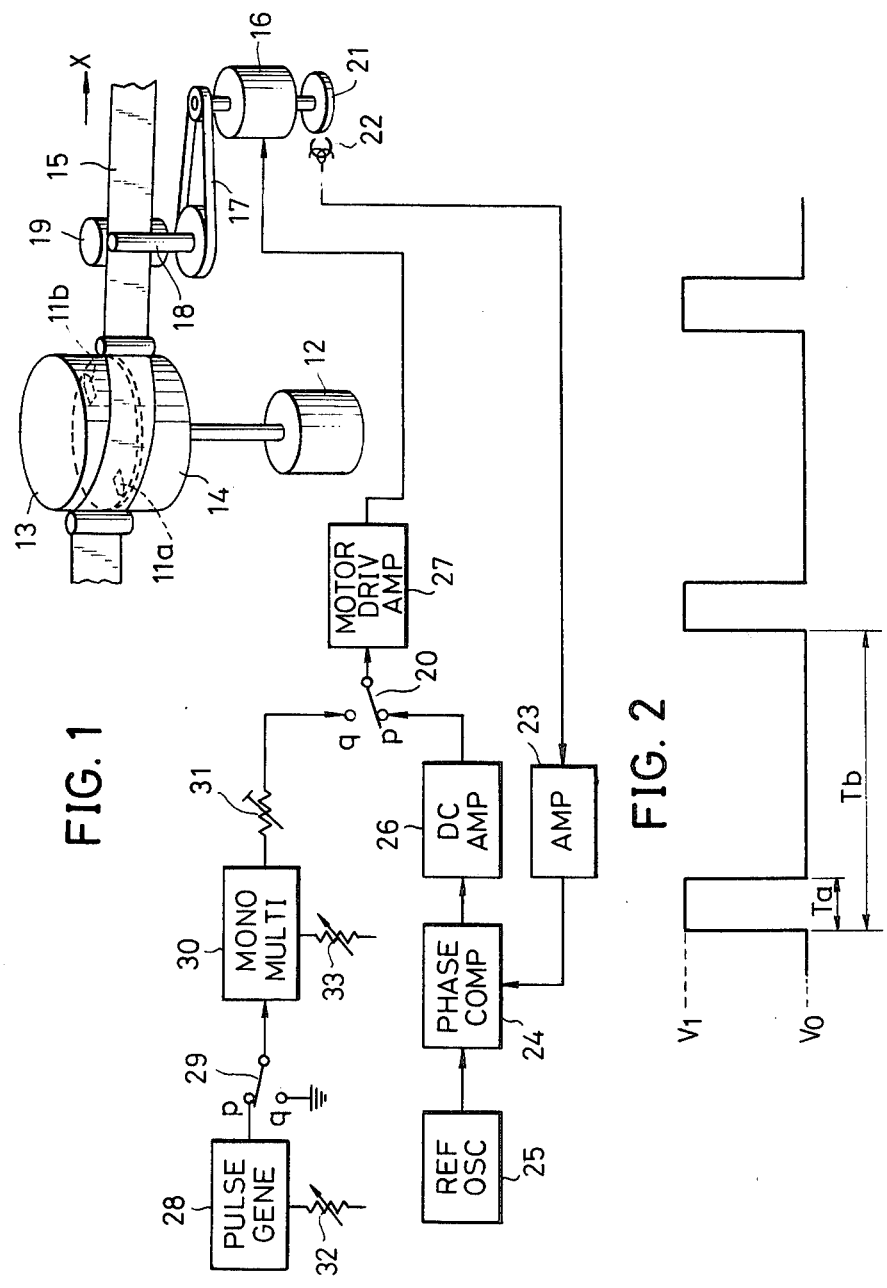

SLOW MOTION TAPE DRIVING SYSTEM IN A RECORDING AND/OR REPRODUCING APPARATUS

BACKGROUND OF THE INVENTION

The present invention relates to a tape driving system for use in recording and/or reproducing apparatus, and more particularly to an apparatus capable of reproducing a tape on which video signals have been recorded, wherein the tape travels or shifts intermittently in a manner such that good quality slow-motion reproduction of the video signal can be carried out.

In a helical scanning type of video recording and reproducing apparatus, the video signals are successively recorded by one or more rotating heads on tracks oblique to the longitudinal direction of the tape, with, for example, one field being recorded per track. For slow motion reproduction of these recorded video signals, the tape is driven at a speed which is slower than that used in the recording mode (or normal reproducing mode). Accordingly, in reproduction, the rotating heads repeatedly trace the respective tracks a number of times, whereby the reproduced picture has a slower motion than it would have if reproduced in a normal reproducing mode. It is in this way that slow-motion reproduction is achieved. Moreover, when the tape is stopped, a single track is repeatedly traced by the rotating heads to reproduce a still picture.

In the slow-motion reproducing mode or the still picture reproducing mode, the rotating heads rotate at the same speed as in normal reproduction mode, while the tape is driven at a speed slower than that in a normal reproducing mode or is stopped completely. As a result the inclination angle of the track traced by the rotating head on the tape in slow-motion and still picture reproduction mode differs from the inclination angle of the track in a recording mode (or normal reproducing mode) and this difference in inclination gives rise to tracking deviation.

In reproduction, when the rotating heads deviate from the signal tracks on the tape, a noise bar is generated in the reproduced picture. In the conventional slow-motion reproduction, the tape is continuously driven at a speed slower than the normal traveling speed at the time of a normal reproducing mode. The position at which the rotating heads deviate from the tracks undergoes successive shifts. For this reason, the position of the noise bar continuously shifts in the reproduced picture, (from top to bottom, for instance) and the noise therefore impairs the quality of the entire reproduced picture.

Similarly, in the case of still picture reproduction, depending on the position at which the tape stops, the noise bar will be adversely generated at the center or some other conspicuous part of the picture screen. In this case, the operator must manipulate the reel to rotate it slightly and cause the tape to shift a minute distance so that the noise bar becomes concealed on the top or bottom of the picture screen. However, in the cassette-type recording and reproducing apparatus reduced to practice in recent years, the reels are positioned within the cassette. Thus, it is impossible for the operator to shift the tape by a manual operation.

A DC motor is generally used for rotating the capstan so as to make it possible to drive the tape at different speeds. When the DC motor is to be rotated slowly for slow speed tape travel, the voltage applied to the DC motor is lowered to a potential which is less than the potential used at the time of normal rotation. However, when the voltage applied to the motor is lowered, the rotational torque of the motor decreases, and as a result the tape cannot be driven stably.

Moreover, when the DC motor is to be rotated at a slow speed, it is necessary to overcome starting friction by first applying to the motor a higher voltage, relative to the voltage required to obtain the desired low speed of rotation. Then, after the motor has started the voltage is reduced to the value required for slow speed rotation. However, the raising and lowering of the voltage applied to the DC motor to change the speed of rotation gives rise to hysteresis thus introducing a complex factor into rotation speed control and adjustment.

In addition, some video recording and reproducing apparatus have two motors for driving a capstan, one motor being used for normal reproduction (for normal speed rotation) and another motor for slow motion reproduction (for slow speed rotation). At the time of slow motion reproduction, the rotation of the motor for slow motion reproduction is transmitted to the capstan. This apparatus eliminates the above described difficulties but requires a more complex mechanism which must be capable of switching between the two motors.

Moreover, another known apparatus transmits the rotation of a single motor through a reduction changeover mechanism to the capstan a slow-motion reproducing mode. This apparatus, however, requires a reduction changeover mechanism, thus increasing the complexity of the mechanism.

Furthermore, if these conventional apparatus are to be contstructed so as to allow the operator to freely and continuously vary the speed of rotation of the capstan, their mechanisms must be made even more complex.

SUMMARY OF THE INVENTION

Accordingly, it is the general object of the invention to provide a novel and useful tape driving system for recording and/or reproducing apparatus, in which the above described difficulties have been overcome.

Another object of the present invention is to provide a system for driving the tape so as to travel or shift intermittently by rotating a DC motor for driving the capstan intermittently. In this system, the tape makes intermittent shifts, each shift being one track in distance. Between shifts, when the tape is stopped, the same track is traced by the rotating heads a number of times and in this way slow-motion reproduction is carried out. When the tape is being shifted, noise is generated for a samll period of time. However, this noise can be pushed into an inconspicuous part of the reproduced picture so that the viewer can enjoy good quality slow-motion reproduction. In addition, when the tape is stopped to reproduce a still picture, the position of the tape can easily be adjusted so as to cause the noise to appear at an inconspicuous part of the reproduced picture.

Still another object of the present invention is to provide a system for driving tape by the intermittent rotation of a motor in which a high voltage is applied intermittently to start up the DC motor. Over a period of time which is long relative to the frequency of the intermittent shifts the motor can be considered as performing ordinary slow speed rotation.

Further objects and features of the invention will be apparent from the following detailed description when read in conjunction with the accompanying drawings.

BRIEF DESCRIPTION OF THE DRAWINGS

In the drawings:

FIG. 1 is a block diagram of a first embodiment of a tape driving system in a recording and/or reproducing apparatus according to the invention;

FIG. 2 is a graph indicating the waveform of a voltage applied to a DC motor;

DETAILED DESCRIPTION

Figure 3:
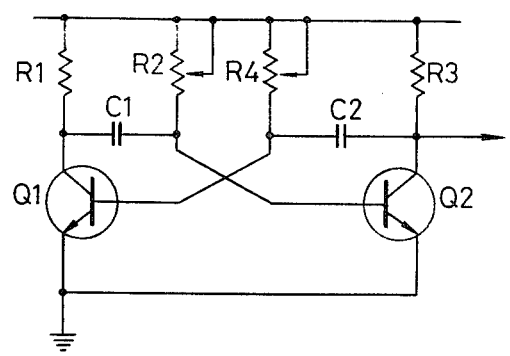
FIG. 3 is a circuit diagram showing another example of a pulse voltage generation means.

Referring first to FIG. 1, a pair of recording and reproducing video heads 11a and 11b are mounted on diametrically opposite sides of a rotary drum 13 rotated at a rotational speed of 30 rps. by a motor 12. A magnetic tape 15 is wrapped obliquely around the rotary drum 13 and a stationary drum 14 and is driven to travel in the arrow direction X by a capstan 18, which in turn is dirven by a direct current (DC) motor 16 acting through an endless belt 17 and a pinch roller 19. A video signal is recorded by the video heads 11a and 11b alternately along tracks on the tape 15, successively one field per track, the tracks being positioned contiguously to each other and obliquely relative to the longitudinal direction of the tape.

In a normal reproducing mode, a moving contact of a switch 20 is connected to a contact point p. A rotating disc 21 having magnets mounted thereon is fixed onto and rotates unitarily with the rotating shaft of the DC motor 16. As the motor 16 rotates, rotation detection pulses are produced by a pickup head 22 disposed to confront the rotating disc 21. The rotation detection pulses are amplified in an amplifier 23 and thereafter supplied to a phase comparator 24 where they are subjected to phase comparison with a reference signal from a reference signal oscillator 25. The resulting output error signal of the phase comparator 24 is supplied by way of a direct current amplifier 26 and the switch 20 to a motor driving amplifier 27. Accordingly, the motor 16 is driven by the output signal of the motor driving amplifier 27 is so controlled that it rotates at a constant speed. The above described loop is the same as the constant speed servo loop which has been reduced to practice heretofore.

Next the operation in slow-motion reproducing mode will be described.

In this operation, the moving contact of the switch 20 is changed over and connected to the other contact q, and the moving contact of a switch 29 is connected to a contact point p. A pulse generator 28 sends out a square waveform pulse signal of low frequency which is supplied through the switch 29 to a monostable multivibrator 30 which is triggered thereby. As a result, the monostable mulitvibrator 30 sends out a pulse signal with a pulse width of Ta and a pulse cycle period of Tb, as indicated in FIG. 2.

The voltage of the pulse signal from the monostable multivibrator 30 is set by a variable resistor 31 to a voltage V1 which is adequate for normal start-up of the motor 16. The pulse voltage signal set by the variable resistor 31 is supplied through the switch 20 to the motor driving amplifier 27 thereby to drive the motor 16. The motor 16 is supplied with current only for the interval of time Ta during which the voltage of the pulse signal is V1 and is energized to rotate over an angle corresponding to the interval of time Ta. Then, since the voltage is reduced to zero (V0) immediately after the interval of time Ta has elapsed, the motor 16 terminates its rotation and remains stopped for an interval of time (Tb−Ta).

The voltage V1 is then applied again and the motor 16 again rotates over the predetermined angle and stops. Thereafter, this operation is repeated so that the motor 16 is made to perform intermittent rotation.

The pulse width Ta can be varied by adjusting the resistance of a variable resistor 33 in the monostable multivibrator 30. The variable resistor 33 is therefore adjusted to set the pulse width Ta to the value which causes the angle of rotation of the motor 16 during each pulse to be such that the motor 16 drives the tape 15 via the capstan 18 by a length corresponding to a single track pitch of the track pattern of the tape 15. The period of time Ta is, for example, on the order of 20 msec.

Thus, the tape 15 stops after being driven a distance corresponding to one track pitch. The video heads 11a and 11b are repeatedly moved over substantially the same track a number of times during the interval of time (Tb−Ta), whereby the information content of the same field is reproduced the same number of times on the picture screen. Since the tape 15 is stopped during the stop motion scanning operation of the heads, the angle of inclination of the tracing locus of the video heads 11b and 11b on the tape 15 differs from the angle of inclination of the track recorded on a moving tape. This inevitably results in a tracking deviation.

In the present invenion, the adjustment and setting of the tape travel distance is made in such manner that the tracing locus of the video heads 11a and 11b deviates furthest from the recorded track at the beginning and end of the track and substantially coincides with the recorded track at the intermediate part thereof. That is, the video heads substantially trace the intermediate part of the recorded track in a normal manner. For this reason, the picture quality is degraded to a certain extent only at inconspicuous positions, that is, at the top and bottom of the picture screen, whereby a practically useful reproduced picture can be obtained.

Moreover, when the tape is driven by one track pitch, a noise is generated in the reproduced picture. However, since this noise is generated only once per several fields on the reproduced slow motion picture screen and only for an extremely minute interval of time (20 msec), it gives rise to almost no difficulties in practical application.

It should be noted that once the variable resistor 33 has been set as described hereinbefore, slow-motion reproduction will proceed as the operation described heretofore is repeated successively.

In this manner, the tape is driven or shifted intermittently and each track is traced a number of times to reproduce the information contained therein an equal number of times, whereby a picture reproduced in slow-motion is obtained. According to the system of the present invention, since the tape is not driven continuously, the noise bar generated when the video heads straddle adjacent tracks does not appear in such a manner that it moves on the reproduced picture, as is the case in the prior art. Moreover, this invention does not employ the arrangement of prior art wherein the motor is rotated continuously at a low voltage, but instead uses an arrangement wherein the motor is driven intermittently by applying a voltage V1 of sufficient magnitude to initiate the rotation of the motor, whereby stable and positive driving of the motor can be accomplished.

The slowness of the motion in reproduction (the motion ratio) is determined by the number of times the same track is traced and reproduced. That is, it is dependent on the interval of time (Tb−Ta) during which the tape is stopped. The interval of time Tb can be variably set by adjusting a variable resistor 32 in the pulse generator 28. This interval of time Tb is, for example, set to a value on the order of 0.2 sec to 2 sec.

In the system of the present invention, a DC motor is used as the motor 16. Accordingly, in contrast to pulse motors wherein the rotational angle is determined by the number of pulses applied thereto, the rotational angle of the motor 16 can be set to an arbitrary value by selecting the desired length of the interval of time Ta. Further, the motor 16 can be rotated continuously by applying a constant voltage thereto. As a consequence, a good quality picture can be obtained in both normal and slow-motion reproduction by use of a single motor.

In addition, since the signal information content of adjacent tracks is very similar, there can be obtained a slow-motion reproduced picture which in no way appears unnatural to the viewer even if the tape travels intermittently and each track is traced and reproduced a number of times.

Next, in still picture reproduction, the moving contact of the switch 29 is switched to the contact point q, while the switch 20 is left on the contact point q. Accordingly, the output pulse from the pulse oscillator 28 is not supplied to the monostable multivibrator 30 so that both the motor 16 and the tape 15 stop.

Accordingly, the video heads 11a and 11b trace only one track to reproduce it repeatedly as a still picture. Here, by setting the interval of time Ta as described above, it is possible to obtain a good quality still picture in which the noise bar is always at an inconspicuous position on the picture screen. It should be noted that the good quality still picture can be obtained regardless of when (at what instant) the switchover from slow-motion reproducing mode to still picture reproducing mode is made.

Furthermore, at the time of reproducing a still picture, instead of changing over the switch 29, the variable resistor 33 may be adjusted so that the interval of time Ta is made zero and so that no pulse-like voltage is generated. Moreover, in a case where the tape is not stopped at the desired position, the variable resistor 33 can be adjusted while observing the reproduced picture to shift the tape intermittently by minute distances until it reaches the desired position.

The above described embodiment is an arrangement in which variable resistors 31 through 33 are respectively adjusted thereby to adjust the voltage V1 and the interval of time Tb and Ta. However, if any one among these variable resistors is fixed, the other variable resistors are adjusted variably.

Moreover, instead of the pulse generator 28 and the monostable multivibrator 30, an ordinary astable multivibrator comprising transistors Q1 and Q2, capacitors C1 and C2, and resistors R1 through R4, as indicated in FIG. 3 may be used. The resistors R2 and R4 are variable resistors. By changing the resistance of these variable resistors, the periods of time Ta and Tb can be adjusted and set appropriately.

Figure 4:
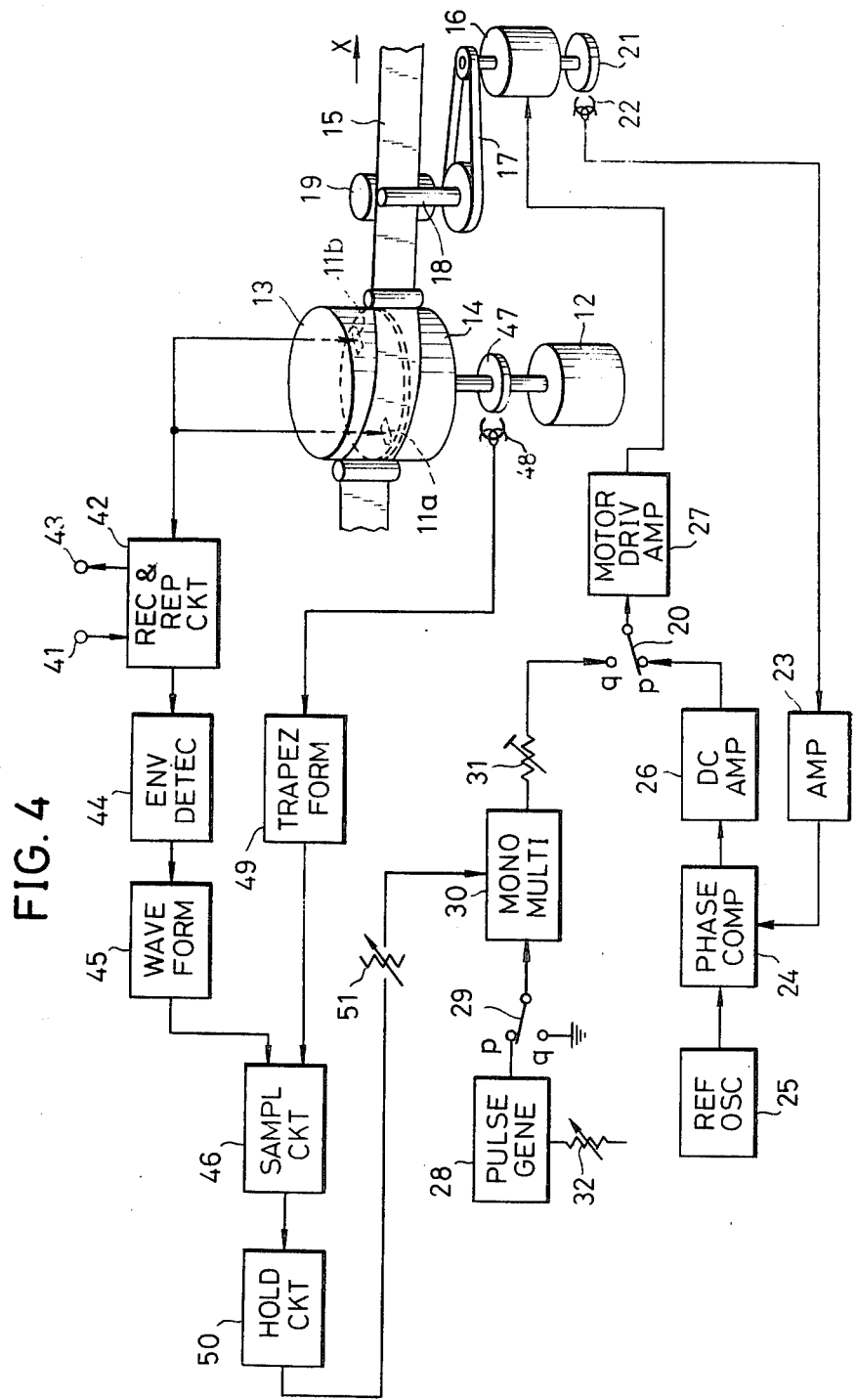
FIG. 4 is a block diagram showing a second embodiment of a tape driving system in a recording/reproducing apparatus according to the invention.

Next, a second embodiment of a system of the present invention will be described in conjunction with FIG. 4. In FIG. 4, parts similar to parts in FIG. 1 are designated by like reference numerals, and a detailed description thereof will be omitted.

In the recording mode, the video signals to be recorded are introduced into the system through an input terminal 41, passed through a recording and reproducing circuit 42 and supplied to a pair of recording and reproducing video heads 11a and 11b to be recorded on the tape 15. In the reproducing mode, the video signals reproduced by the video heads 11a and 11b are passed through the recording and reproducing circuit 42 and led out through an output terminal 43.

Figure 5:
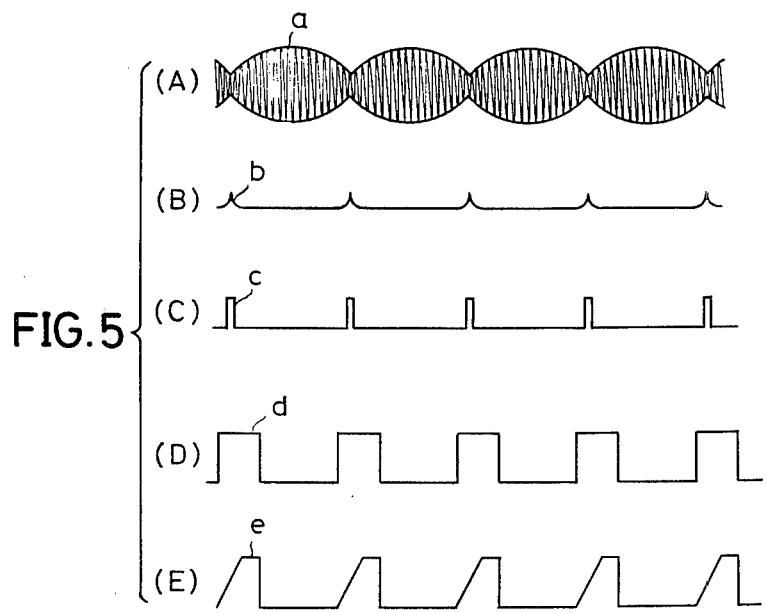
FIGS. 5(A) through 5(E) are graphs indicating waveforms appearing at various points in the block diagram shown in FIG. 4.

In slow motion reproduction, the reproduced frequency modulated video signal a, the form of which is shown in FIG. 5(A), is passed from the recording and reproducing circuit 42 to an envelope detection circuit 44. Since, in the slow-motion reproduction mode, the inclination angle of the video head tracing locus differs from that of the recorded track, the envelope of the reproduced signal has one minimum level part per field, as indicated in FIG. 5(A). The signal a is supplied to the envelope detection circuit 44, where it is subjected to an envelope detection. The resulting detected signal b of the form shown in FIG. 5(B) is obtained from the detection circuit 44, in response to the minimum positions of the envelope. The signal b is supplied to a waveform shaping circuit 45, where its waveform is shaped into that of the signal c shown in FIG. 5(C). The pulses of signal c are supplied to a sampling circuit 46 as sampling pulses.

A rotating disc 47 having magnets mounted thereon is fixed to a rotating shaft which is rotated together with the rotating drum 13 by the motor 12. As the drum 13 and the disc 47 rotate, a signal d of the form indicated in FIG. 5(D) is picked up by a pickup head 48. The picked up signal d is supplied to a trapezoid waveforming circuit 49, where it is waveformed into a trapezoid wave signal e of the form indicated in FIG. 5(E).

The trapezoid wave signal e is supplied to the sampling circuit 46, where it is sampled responsive to the above described sampling pulse signal c. The output signal of the sampling circuit 46 is supplied to a holding circuit 50. Accordingly, from the holding circuit 50, there is obtained a hold error signal corresponding to the phase difference between th signal e and the signal c. The level of this error signal is set by a variable resistor 51 and is then supplied to a monostable multivibrator 30.

The pulse width Ta (see FIG. 2) of the pulses output of the monostable multivibrator 30 is determined by the voltage (error voltage) applied thereto by way of the variable resistor 51.

If the phase of the signal d is adjusted appropriately by a circuit such as a delay circuit (not shown) disposed at a stage just preceding the trapezoid waveforming circuit 49 in a manner such that the root positions of the signal a are caused to be substantially within the vertical blanking periods, the noise bar can be lowered to a position near the vertical blanking part and will not appear in the reproduced picture.

Moreover, in the above described embodiment of the present invention, the rotation of the motor 16 is controlled by using the phase comparison error voltage obtained through phase comparison between the signals c and d. Accordingly, in the case where the root positions of the envelope of the reproduced frequency modulated video signal a deviate from the phase of the rotating pulse from the head 48, the rotation of the motor 16 is so controlled that the phases of the envelopes and rotation pulses coincide with each other.

The means for detecting the minimum level of the reproduced frequency modulated video signal is not limited to the envelope detection circuit used in the present embodiment. Instead means may be used for detecting points where the horizontal synchronizing signal of the demodulated video signal is discontinuous or missing together with means for forming a sampling pulse.

Further, this invention is not limited to these embodiments. Variations and modifications may be made without departing from the scope of the invention.

What is claimed is:

1. A tape driving system for use in a recording and/or reproducing apparatus which may be selectively operated at any of a plurality of different modes, including at least a slow-motion mode, said recording and/or reproducing apparatus having at least one rotating video signal head for tracing tracks lying obliquely on a tape and for reproducing a video signal, said tape driving system comprising:
   means for driving said tape;
   a DC motor for driving said tape driving means;
   means for forming recurring pulse-like voltages, each of said pulses having a predetermined level and a predetermined width, said pulses recurring at a given frequency;
   means for producing a continuous voltage; and
   means for selectively applying either the pulse-like voltages from said forming means or the continuous voltage from said producing means to said DC motor depending on the selected reproducing mode, said pulse-like voltages being applied to said motor in a slow motion reproducing mode to rotate said motor during the pulse width and cause said tape driving means to intermittently shift said tape.

2. A tape driving system as claimed in claim 1 in which the predetermined pulse width of said pulse-like voltages has a duration which causes said motor to rotate through an angle which causes said tape driving means to shift said tape by the distance between adjacent tracks on said tape.

3. A tape driving system as claimed in claim 1 in which said pulse-like voltages forming means comprise means for adjusting the width of said pulse-like voltages.

4. A tape driving system as claimed in claim 1 in which said pulse-like voltages forming means comprise a pulse generation circuit for generating a pulse signal of a given frequency, and means triggered by said pulse signal for generating the pulse-like voltages having the predetermined width.

5. A tape driving system as claimed in claim 4 which further comprises means for adjusting the voltage level of said pulse-like voltages, and in which said pulse generation circuit has means for adjusting the frequency of said pulse signal, and said pulse-like voltages generating means comprise means for adjusting the duration of said pulse-like voltages.

6. A tape driving system as claimed in claim 1 in which said pulse-like voltages forming means comprise astable multivibrator means having variable resistors for variably adjusting the frequency and width of the output pulse-like voltages.

7. A tape driving system as claimed in claim 1 which further comprises means for detecting the points of minimum signal level in the signals reproduced from said tape by said rotating head and thereby obtaining a first detection signal, means for detecting the rotation of said rotating head and thereby obtaining a second detection signal, means for comparing and detecting the difference in phase between said first and second detection signals, and means for supplying the detected difference in phase to said pulse-like voltages forming means as a phase error signal for controlling the width of the pulse-like voltages.

8. A tape driving system as claimed in claim 7 in which said means for obtaining said first detection signal comprises means for detecting the envelope of said reproduced signal, and means for forming a first detection signal corresponding to the points of minimum signal level of the detected envelope.

9. A tape driving system as claimed in claim 1, 2 or 3 in which said pulse-like voltages forming means comprise means for adjusting the frequency of said pulse-like voltages.

10. A tape driving system as claimed in claim 1, 2 or 3 in which said pulse-like voltages forming means comprise means for adjusting the level of said pulse-like voltages.

* * * * *